United States Patent
Ashe

Patent Number: 5,900,872
Date of Patent: May 4, 1999

[54] METHOD AND APPARATUS FOR CONTROLLING THE TRACKING OF MOVABLE CONTROL ELEMENTS IN A GRAPHICAL USER INTERFACE

[75] Inventor: Dylan B. Ashe, Sunnyvale, Calif.

[73] Assignee: Apple Computer, Inc., Cupertino, Calif.

[21] Appl. No.: 08/944,254

[22] Filed: Oct. 6, 1997

Related U.S. Application Data

[63] Continuation of application No. 08/435,828, May 5, 1995, abandoned.

[51] Int. Cl.⁶ .................................................... G06T 1/00
[52] U.S. Cl. ......................... 345/339; 345/123; 345/418; 345/157
[58] Field of Search ................................ 345/418, 113, 345/114, 118, 121, 123–125, 326, 333–334, 339, 341, 348, 349, 145, 157

[56] References Cited

U.S. PATENT DOCUMENTS

| | | | |
|---|---|---|---|
| 5,283,560 | 2/1994 | Bartlett | 345/113 |
| 5,333,247 | 7/1994 | Gest et al. | 395/973 X |
| 5,392,388 | 2/1995 | Gibson | 395/973 X |
| 5,452,413 | 9/1995 | Blades | 395/973 X |
| 5,469,540 | 11/1995 | Powers, III et al. | 395/336 |
| 5,479,600 | 12/1995 | Wroblewski et al. | 395/973 X |
| 5,506,951 | 4/1996 | Ishikawa | 395/157 |
| 5,526,480 | 6/1996 | Gibson | 395/154 |
| 5,532,715 | 7/1996 | Bates et al. | 345/123 |
| 5,553,225 | 9/1996 | Perry | 395/157 |
| 5,745,100 | 4/1998 | Bates et al. | 345/157 |

OTHER PUBLICATIONS

"MacIntosh Tool Box Essentials", *Inside MacIntosh*, Control Manager, Chapter 5, pp. 7–10, 30–37, 43–65 and 88–92.

*Primary Examiner*—Joseph H. Feild
*Attorney, Agent, or Firm*—Burns, Doane, Swecker & Mathis, L.L.P.

[57] ABSTRACT

In a graphical user interface for computers, a scroll bar tracking and drawing procedure associates elements of the scroll bar with regions on the display. The region for the thumb can move relative to the other regions, and thereby track the movement of the cursor. Within each element's associated region, any desired pattern can be drawn. As a result, the thumb can be non-rectangular in shape. Furthermore, since the image within a region can be any arbitrary pattern, the image for the thumb can be either a complete image, to accommodate live scrolling, or a ghost image to accommodate ghost scrolling. As such, a single procedure can support both modes of operation, and permit the interface to be easily switched between the two.

20 Claims, 4 Drawing Sheets

METHOD AND APPARATUS FOR CONTROLLING THE TRACKING OF MOVABLE CONTROL ELEMENTS IN A GRAPHICAL USER INTERFACE

This application is a continuation of application Ser. No. 08/435,828, filed May 5, 1995 abandoned.

FIELD OF THE INVENTION

The present invention is directed to graphical user interfaces for computers which have control elements to enable the user to control the operation of the computer and the display of information on the computer's monitor, and more particularly to the manner in which movable control elements in a graphical user interface, such as scroll bar thumbs and the like, are tracked and drawn on a display.

BACKGROUND OF THE INVENTION

Graphical user interfaces for computers typically employ a variety of different types of control elements, or objects, that are actuated by the user of the computer to select from available choices and otherwise control the operation of the computer. For example, to perform a particular action with the computer, the user interface might cause one or more check boxes or push buttons to be displayed, to enable the user to turn certain features on or off, or to indicate acceptance of a displayed set of parameters and continue with a procedure.

Another control element that is commonly employed in a graphical user interface is a scroll bar. Typically, scroll bars are used in connection with windows, which function as containers for displaying the contents of a document. When the area of a window appearing on a monitor is not large enough to display the entire contents of a document, a scroll bar can be employed to position the window over different parts of the document, to enable the user to view the desired portion of the document.

Basically, a conventional scroll bar consists of four main elements, namely an elongated background area, a movable thumb which slides along the length of the background area and a pair of indicators, such as arrows, at either end of the background area to identify the relative directions of movement of the thumb. In operation, a user actuates the scroll bar by "grabbing" the thumb and sliding it along the background area. The action of grabbing the thumb can be carried out by positioning a cursor over the thumb and clicking a mouse button, or analogous control device. Moving the cursor during this state causes the thumb to be repositioned along the background area. The displayed contents of the window "scrolls" to a different portion of the document which corresponds to the new position of the thumb. The scrolling of the document's contents can be dynamic, or "live", in which case the displayed contents move within the window as the cursor is being moved. Alternatively, the scrolling of the document's contents can await the release of the mouse button. In this case, it is desirable to display a transparent image of the thumb while the cursor is being moved, so that the user can determine the new position of the thumb relative to its original position.

As the thumb is being moved by the user, the structure of the scroll bar, or at least that of the thumb, must be continually redrawn on the display, to update its position. To avoid flickering, the redrawing of the scroll bar must be carried out frequently. To this end, therefore, conventional routines for drawing the scroll bar are relatively simple, to permit them to be implemented in a short amount of time. Along these lines, since a rectangle is one of the easiest graphical objects to draw on a display, the elements of conventional scroll bars, particularly the thumb, have had a rectangular shape that was determined by the designer of the graphical interface.

Recently, there has been a move towards providing greater variety of appearance in graphical user interfaces. For example, U.S. patent application Ser. No. 08/243,327, filed May 16, 1994, discloses a user interface that can be customized to present different appearances that accommodate different users's tastes. Different user interface appearances, or themes, can be designed by different software developers, or even the users themselves. In concert with this movement to provide a greater variety in the user interface, it is desirable to provide a method for tracking and redrawing a thumb on a scroll bar, which is not constrained to the use of rectangular objects, to thereby provide flexibility in the appearance of the scroll bar elements.

In the past, scroll bars operated in either a live mode or a "ghost" mode. As described previously, in the live mode, the thumb and the displayed contents of a document moved with the cursor. In the ghost mode, the thumb and the displayed contents remained stationary until the mouse button was released, and only the transparent image of the thumb moved with the cursor. Because the displayed images differed for the two modes, each mode of operation required a different procedure for redrawing the position of the thumb. The particular mode of operation was fixed as part of the code for the graphical user interface, and could not be readily changed to the other mode, without rewriting the code.

To permit greater flexibility in the customization of the graphical user interface, it is further desirable to provide a scroll bar thumb tracking and redrawing procedure which is generic to both the live and ghost modes of scrolling, and thereby enables the user interface to be easily switched between the two modes of operation.

SUMMARY OF THE INVENTION

In accordance with the present invention, these objectives are achieved by means of a scroll bar tracking and drawing procedure in which elements of the scroll bar are associated with regions on the display. A region is an arbitrary area or set of areas on the display, the outline of which forms one or more closed loops. The region for the thumb can move relative to the other regions, and thereby track the movement of the cursor. When the cursor moves, only those portions of the regions which are affected by the movement are redrawn on the display, thereby minimizing the processing time required to implement cursor tracking. Within each element's associated region, any desired pattern can be drawn. As a result, the thumb can be non-rectangular in shape. Furthermore, since the image within a region can be any arbitrary pattern, the image for the thumb can be either a solid image, to accommodate live scrolling, or a transparent image to accommodate ghost scrolling. As such, a single procedure can support both modes of operation, and permit the interface to be easily switched between the two.

Further features of the invention, as well as the advantages offered thereby, are explained in greater detail hereinafter with reference to specific embodiments illustrated in the accompanying drawings.

DETAILED DESCRIPTION

To facilitate an understanding of the present invention, it is described hereinafter in connection with the display of a scroll bar for a document window in a graphical user interface. It will be appreciated, however, that the principles of the invention are not limited to this particular embodiment. Rather, the invention can be practically applied to any type of control object in a graphical user interface in which one element moves along a path defined by another element, under control of the user. For example, the invention can be applied to the display of slider elements that are used to control volume levels or display contrast in a computer.

Generally speaking, the present invention is directed to features of a graphical user interface that runs on a computer. While the particular hardware components of a computer system do not form part of the invention itself, they are briefly described herein to provide a thorough understanding of the manner in which the features of the invention cooperate with the components of a computer system to produce the desired results.

Figure 1:
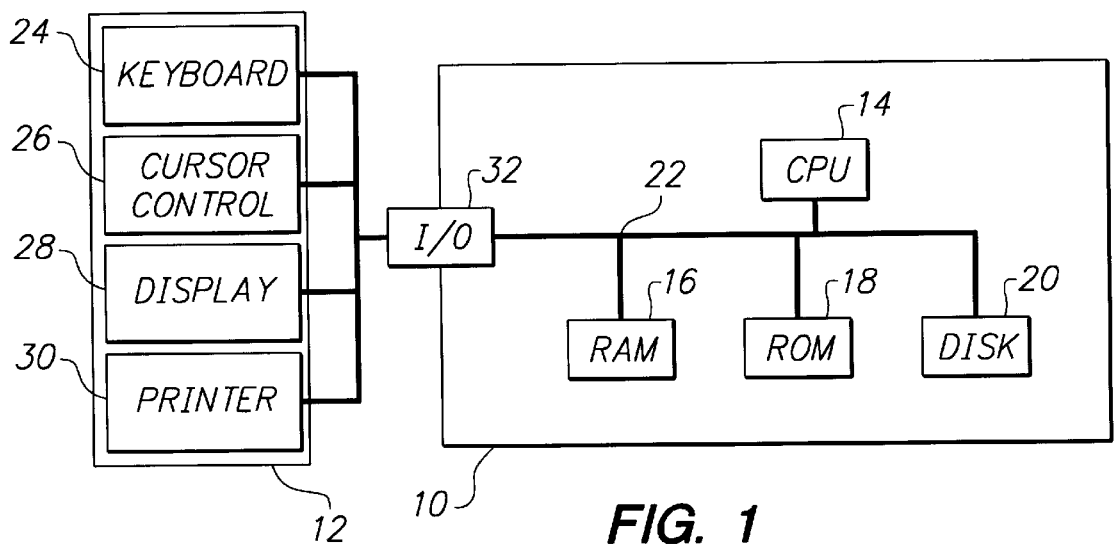
FIG. 1 is a block diagram of an exemplary computer system of a type in which the present invention can be implemented.

Referring to FIG. 1, an exemplary computer system includes a computer 10 having a variety of external peripheral devices 12 connected thereto. The computer 10 includes a central processing unit 14 and associated memory. This memory generally includes a main memory which contains the programs currently being executed on the computer, and which is typically implemented in the form of a random access memory 16. The associated memory also includes a non-volatile memory that can comprise a read-only memory 18, and a permanent storage device, such as a magnetic or optical disk 20, for storing all of the programs, as well as data files. The CPU 14 communicates with each of these forms of memory through an internal bus 22. The peripheral devices 12 include a data entry device such as a keyboard 24, and a pointing or cursor control device 26 such as a mouse, trackball, pen or the like. A display device 28, such as a CRT monitor or an LCD screen, provides a visual display of the information that is being processed within the computer, for example the contents of a document or a computer-generated image. A hard copy of this information can be provided through a printer 30, or similar such device. Each of these external peripheral devices communicates with the CPU 14 by means of one or more input/output ports 32 on the computer.

In a computer system of this type, a graphical user interface can be presented on the display device 28 to provide the user with a convenient mechanism to control the operation of the computer and to receive feedback regarding such operation. The graphical user interface forms part of the computer's operating system that is loaded from the permanent storage memory 20 into the main memory 16 when the computer is started, and which is executed while the computer is running. To provide input and output functionality, the graphical user interface includes various types of control objects which enable the user to select from available choices. Examples of such objects include push buttons, via which the user can indicate acceptance of a particular action, radio buttons for selecting one of a number of available choices for a particular parameter, and check boxes for activating or deactivating various features.

Figure 2:
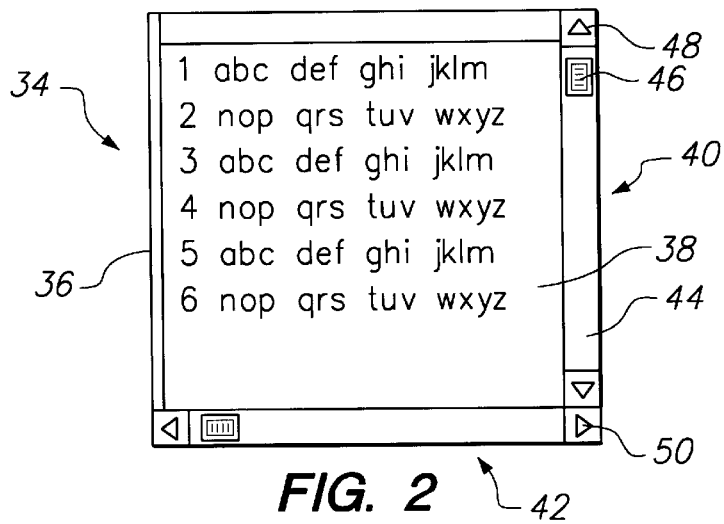
FIG. 2 is an illustration of a document window having vertical and horizontal scroll bars.

In many well-known graphical user interfaces, windows are utilized as containers for information to be displayed to the user on the display device 28. In one typical use, a window defines a border around the contents of a document that the user is creating, editing or viewing through the operation of an application program being executed on the CPU 14. An example of a window being utilized in such a manner is illustrated in FIG. 2. Referring thereto, a window 34 has a rectangular frame, or border, 36 that defines an area 38 within which the contents of a document are displayed. If the document is relatively small, e.g. a few lines of text or a small number of graphical objects, its entire contents might be visible within the area 38 of the window. More typically, however, the area required to display the entire contents of document is larger than that provided within the window 34. For example, the window might display only one-half page of a multipage document.

Figure 3:
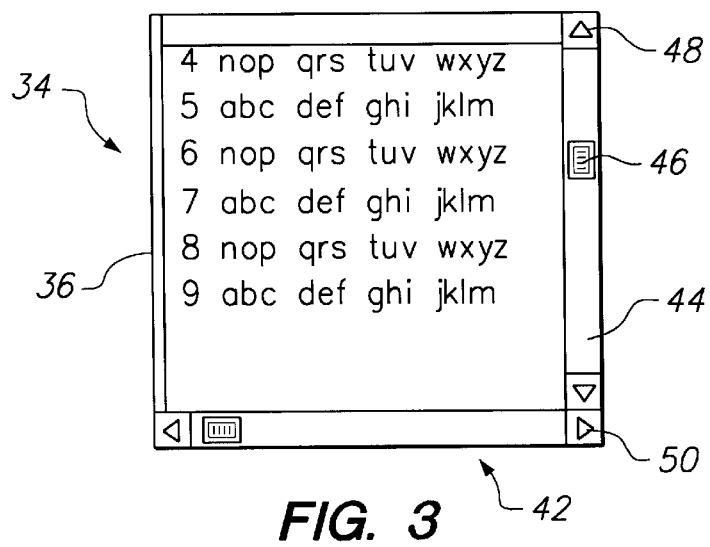
FIG. 3 is an illustration of the document window of FIG. 2 after vertical scrolling has taken place.

To permit the user to view different portions of the document that are not currently visible within the window, it is provided with a scroll bar. In the example of FIG. 2, the window 34 has both a vertical scroll bar 40 and a horizontal scroll bar 42 located along its right and bottom edges, respectively. Each scroll bar consists of four main elements, namely a background area 44, a thumb 46, and a pair of indicator arrows 48 and 50. The position of the thumb 46 relative to the background determines the portion of the document that is currently visible in the window. Thus, when the thumb for the vertical scroll bar 40 is positioned near the top of the background 44, as shown in FIG. 2, the top of page one of the document is visible. If the thumb is moved downwardly, as shown in FIG. 3, successively lower portions of the document, including subsequent pages, become visible. In a similar manner, the thumb of the horizontal scroll bar 42 can be moved to scroll the visible portion of the document from left to right, and back. For example, if two pages of the document are displayed side-by-side, the horizontal scroll bar can be employed to switch between the left and right pages.

There are different known procedures via which the user can move the thumb to scroll the display. For example, by clicking on either of the indicator arrows 48 or 50, the display will scroll a predetermined amount, for example one line of text in the direction of the arrow. By clicking on a portion of the background 44 that does not contain the thumb, the display can scroll by a larger amount, such as one-half of a page. The most commonly employed technique for scrolling the display, however, is to "grab" the thumb and move it along the length of the background. This is typically done by positioning a cursor over the thumb, clicking a mouse button or the like, and dragging the thumb to a new location.

Figure 4:
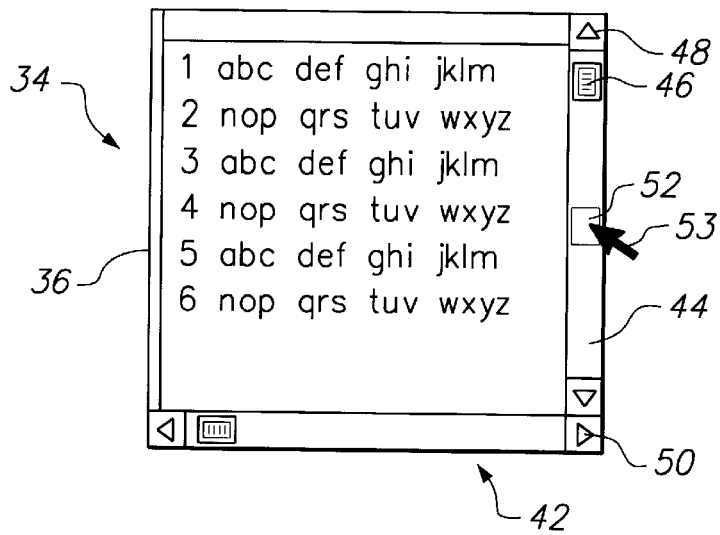
FIG. 4 is an illustration of a scroll bar during ghost scrolling.

There are two possible modes for scrolling the display when the user grabs the thumb and moves it. In one mode, the displayed contents of the window changes dynamically, commensurate with the dragging of the thumb. In addition, the displayed image of the thumb follows the position of the cursor. This mode of operation is referred to as "live" scrolling. In the other mode of operation, the contents of the window and the position of the thumb remain stationary, until the user releases the mouse button. At that time, the contents of the window and the position of the thumb are updated. Referring to FIG. 4, while the user is holding the mouse button down, a transparent image 52 of the thumb is displayed, and follows the movement of the cursor 53. This mode of operation is known as "ghost" scrolling.

Figure 5:
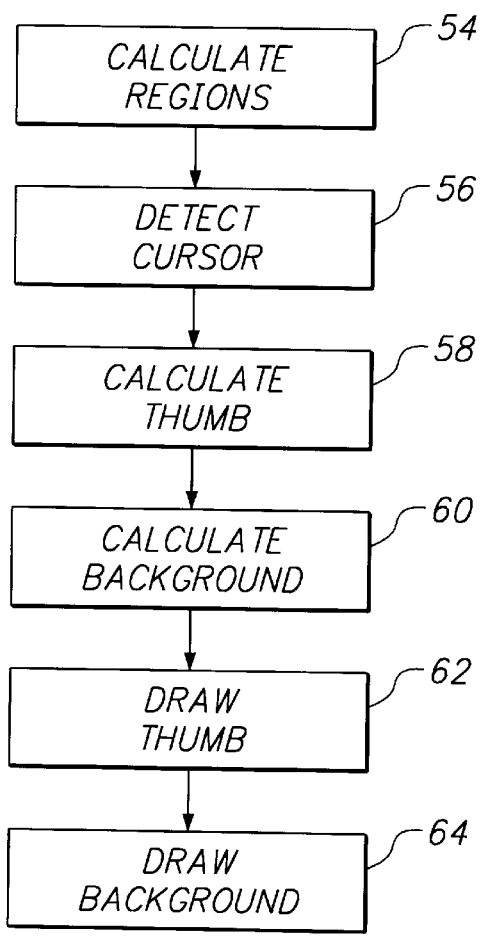
FIG. 5 is a general flowchart of a scroll bar thumb tracking and drawing procedure in accordance with the present invention.

A general flowchart of the process for controlling the display of the thumb, to track the position of the cursor, is illustrated in FIG. 5. In accordance with the present invention, as an initial step in the process display regions are calculated for each of the background 44 and the thumb 46 (Step 54). After these calculations, movement of the cursor is detected (Step 56), and a new display region for the thumb is calculated at Step 58. A redraw region for the background is then calculated at Step 60, to identify areas that have been vacated by the movement of the thumb, in which the background pattern needs to be redrawn. Thereafter the thumb is drawn in its new region at Step 62, and the background area is redrawn at Step 64. This process is repeatedly carried out while the mouse button remains depressed, to continually update the display.

Figure 7:
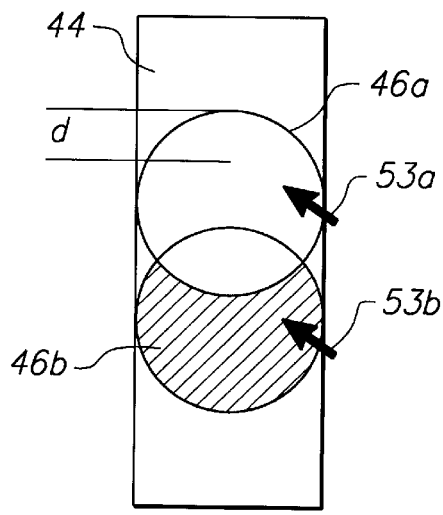
FIG. 7 is a first illustration of the thumb tracking region.
Figure 8:
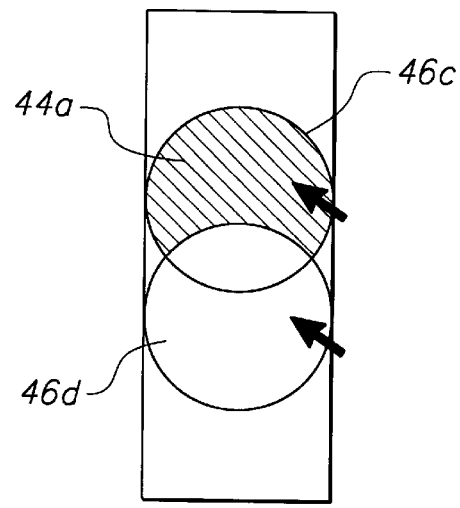
FIG. 8 is a second illustration of the thumb tracking region.
Figure 6A:
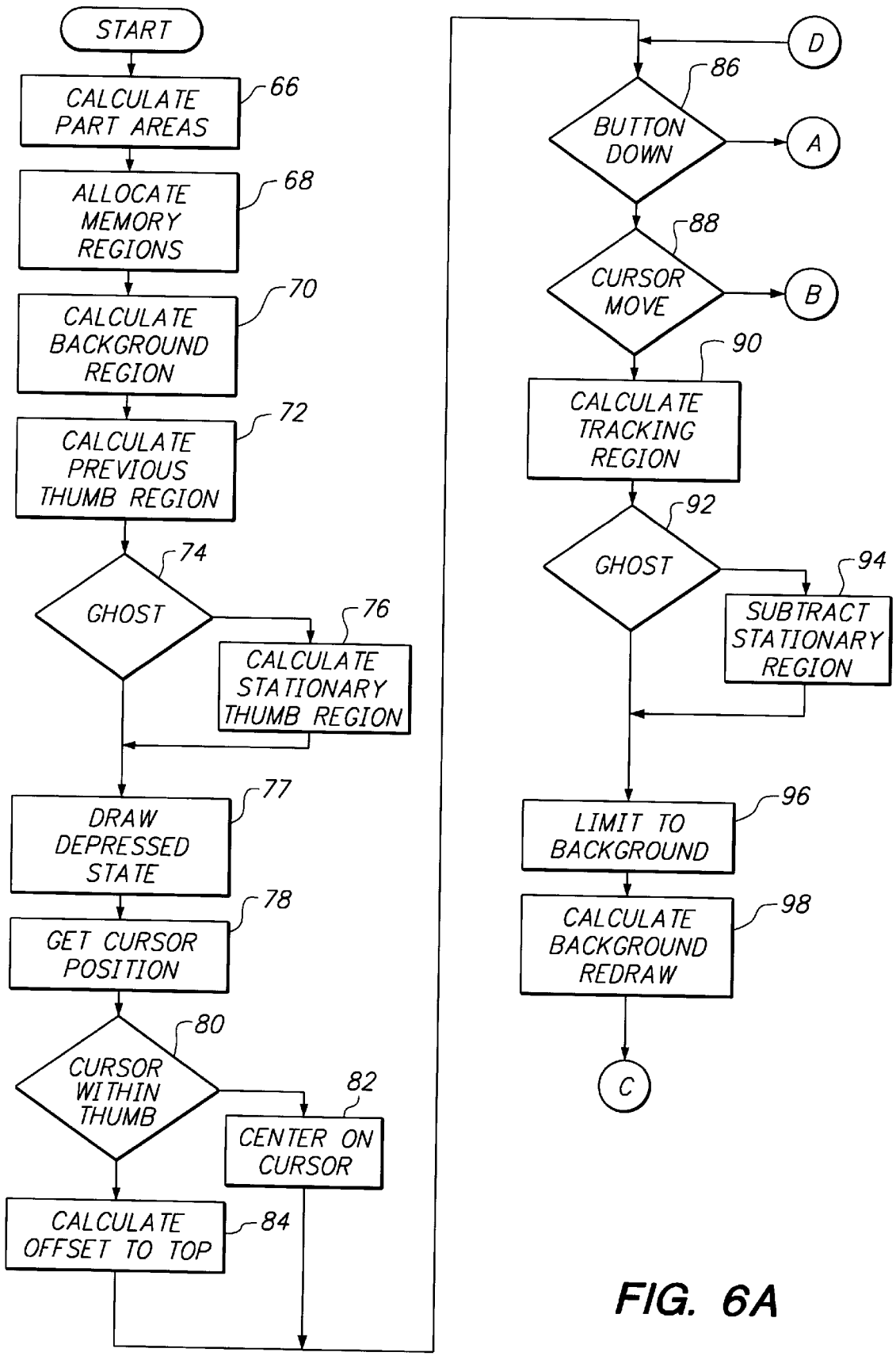
FIGS. 6A and 6B together are a more detailed flowchart of the tracking and drawing procedure.
Figure 6B:
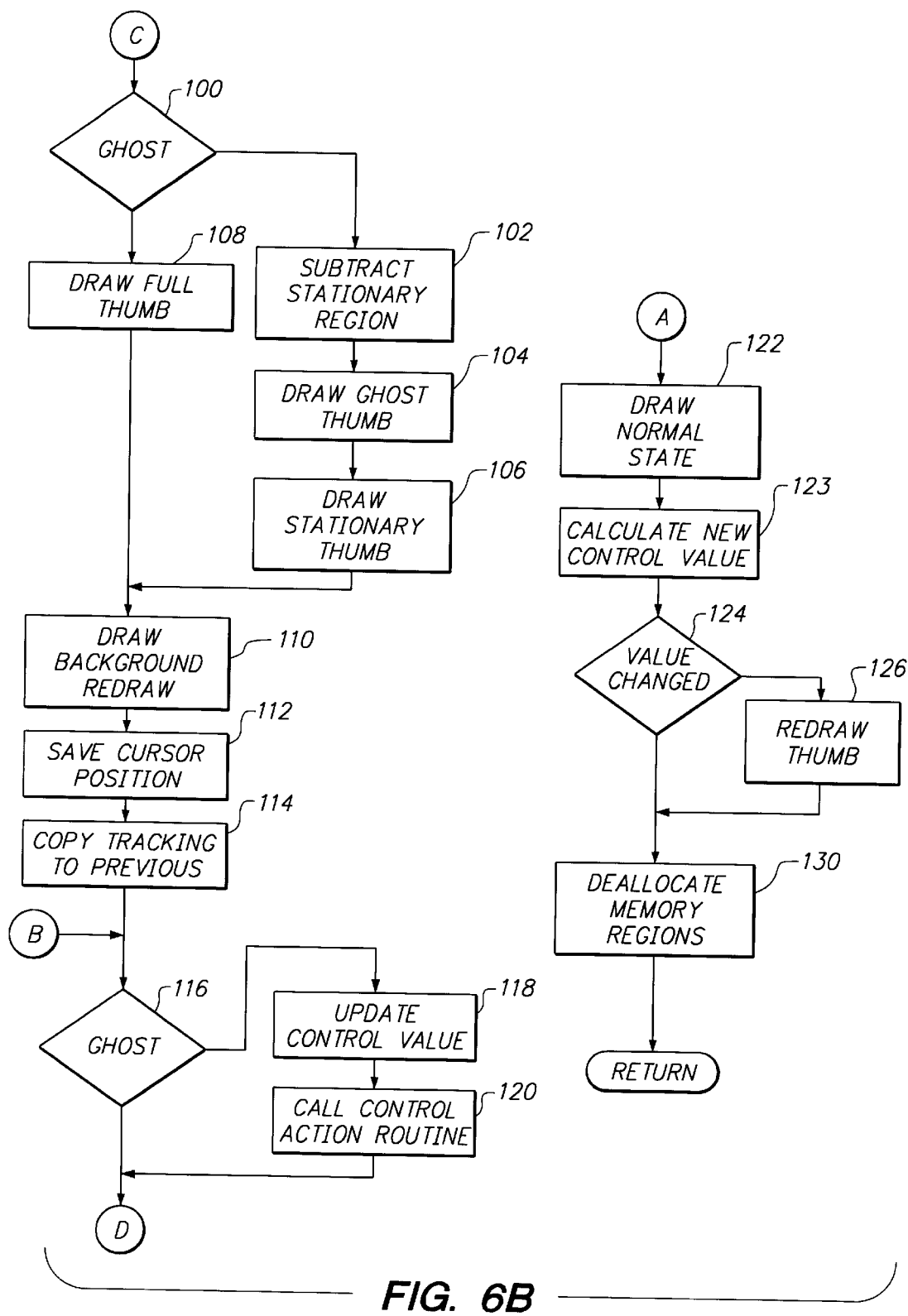

These steps are explained in greater detail with reference to the flowchart of FIGS. 6A and 6B, together with various illustrative examples shown in FIGS. 7–8. The routine depicted in the flowchart of FIGS. 6A and 6B is carried out as part of the regular background operation of operating system software being executed on the computer. It is initiated each time the user clicks the mouse button when the cursor is positioned over the scroll bar thumb. Upon entering the routine, a display area is calculated for each of the elements of the scroll bar, namely the background, the thumb and the two indicators (Step 66). For example, each area might be rectangular in shape. These rectangles define the outer boundaries of the areas in the display in which the respective elements can be drawn. However, the actual elements can be drawn in a smaller area within each rectangele, if desired. As a housekeeping step, regions are allocated in the memory 16 at Step 68, for storing the various tracking regions to be calculated. If insufficient memory is available, no tracking of the cursor is performed. At Step 70, the background region is calculated. This region is the same as the background area of the scroll bar that was calculated at Step 66, except that it does not include the common lines at the respective ends of the background that are shared with each of the indicators 48 and 50. At Step 72, the previous thumb region is calculated. This region corresponds to the actual shape of the thumb, and identifies the location of the thumb at the beginning of each iteration through the tracking routine. It may be the same as the display area of the thumb, or it could be smaller, depending on the shape of the thumb. When the routine first begins, the previous thumb region is the same as the initial position of the thumb.

At step 74 a determination is made whether the scrolling is being carried out in the ghost mode. If it is, there are two thumb images that need to be accounted for, the solid image which remains stationary until the mouse button is released, and the transparent image which follows the cursor. If ghost scrolling is the mode of operation, the stationary thumb region is calculated at Step 76. Again, this region is the same as the current thumb position at the beginning of the routine. If either of the thumb or the background area has a different appearance to simulate a depressed state while the mouse button is down, these elements are redrawn to show that state in Step 77. Thereafter, the current mouse position is detected at Step 78.

The next step in the process is to determine the position of the cursor on the thumb. More particularly, if the user places the cursor on the bottom of the thumb, it is desirable to maintain that positional relationship throughout the tracking process. Depending upon the number of activities being carried out by the computer and the speed of the processor, there may be an appreciable delay between the time that the routine first begins and the time that the cursor's position is detected at Step 78. If the user should move the cursor during this time, it may no longer be positioned on the thumb, particularly if the user grabbed the thumb near its edge. Therefore, at Step 80 a preliminary check is made to see if the cursor is still located within the region of the thumb. If it is not, the thumb is repositioned so that it is centered on the cursor, at Step 82. Otherwise, the position of the cursor is calculated as a function of its distance from the top of the thumb, at Step 84.

At Step 86, a check is made whether the mouse button is still depressed. If it is, a determination is made at Step 88 whether the cursor has moved since the last check of its position. If the cursor has moved, a thumb tracking region is calculated at Step 90. This region is calculated from the new position of the cursor and the offset that was calculated at Step 84. Referring to FIG. 7, the original position of the thumb is indicated by the bold circle 46a, and the position of the cursor when the mouse button was clicked is depicted by the arrow 53a. The offset calculated at Step 84 is equal to the distance d. If the cursor has moved to the position of arrow 53b, the thumb tracking region is indicated by the thin circle 46b. The top of this region is equal to the new position of the cursor, 53b, plus the offset d.

At Step 92, a check is again made whether the tracking control is operating in the ghost scrolling mode. In this mode of operation, in the preferred embodiment, the transparent image of the thumb is made to appear as if it is emerging from under the actual thumb. Therefore, if the ghost mode is in effect, the stationary region 46a of the thumb is subtracted from the tracking region 46b at Step 94. The resulting tracking region is represented by the shaded area in FIG. 7.

After the tracking region is calculated, it is compared with the background region. The thumb must remain within the background area, even if the cursor is dragged beyond the length of the background. Therefore, at Step 96 the tracking region 46b is moved back into the background region, if necessary.

Once the tracking region has been established, the portion of the background area that needs to be redrawn, if any, is determined. More particularly, during each iteration of the tracking procedure during which the thumb moves along the background, the portion of the background which was just vacated by the thumb must be redrawn with the background area pattern. Referring to FIG. 8, if the thumb tracking region moves from position 46c to position 46d during one iteration, the shaded area 44a needs to be redrawn with the background pattern. Therefore, at Step 98, the background redraw region 44a is calculated by subtracting the thumb tracking region 46d from the previous thumb region 46c. At Step 100 a check is made whether the scrolling is in the ghost mode. If so, the region of the stationary thumb is subtracted from the redraw region at Step 102. With reference to FIG. 7, if the transparent image 46b is emerging from under the thumb 46a, there is no need to redraw any portion of the background at that time, and therefore the net redraw region is zero. However, once the transparent image has emerged from beneath the thumb, the background redrawing will begin to occur.

After the regions have been determined, the tracking thumb is drawn within its region. If ghost scrolling is the mode of operation, the drawing code for the transparent image is called at Step 104, and the transparent image is drawn in the thumb tracking region. In addition, the stationary thumb is redrawn in its region at Step 106. If live scrolling is taking place, the drawing code for the solid thumb image is called at Step 108 and drawn in the thumb tracking region. Thereafter, the background pattern is drawn in the background redraw region, at Step 110. The detected position of the cursor is saved in memory at Step 112, and the thumb tracking region is saved as the previous thumb region at Step 114, in preparation for the next iteration.

At Step 116, another check is made whether the ghost scrolling mode of operation is in effect. If it is, the procedure returns to Step 86, to continue to update the position of the thumb. If live scrolling is taking place, a control value which identifies the position of the thumb is updated at Step 118, and a control action process is called at Step 120. This process is a routine provided by the application program that is currently running, and updates the contents of the window to correspond to the position of the thumb. The process then returns to Step 86 for the next iteration.

If no movement of the cursor is detected at Step 88 during any iteration, the procedure jumps immediately to Step 116, since no redrawing of either the thumb or the background is required.

Eventually, the user releases the mouse button, which is detected at Step 86. At this point, the process jumps to Step 122, where the background and the thumb are redrawn in their normal, i.e. non-depresssed state. At Step 123, a new control value for the thumb position is calculated. This new value is compared to the previous value at Step 124. If there was a change, the thumb is redrawn in the last thumb tracking region, at Step 126. If there was no change, i.e. the user eventually returned the thumb to its original position, no drawing is necessary. Finally, the memory regions are deallocated at Step 130, and the procedure returns.

From the foregoing, it can be seen that the present invention provides a tracking procedure which facilitates the customization of graphical user interfaces. In particular, by defining drawing regions for the elements that move relative to one another, any desirable shape and pattern can be employed for these elements without affecting the drawing routines. When the cursor moves, only those portions of the display which are affected by the movement are redrawn, rather than the entire control. With this approach, the tracking procedure can be carried out quickly and avoid flickering. Furthermore, the tracking procedure readily accommodates both live scrolling and ghost scrolling, and thereby enables the user interface to be readily switched between the two modes of operation.

It will be appreciated that the principles of the invention can be applied to other control objects of a graphical user interface in which one element moves along a path that is defined by another element. For example, a slider is another type of control object to which the present invention can be applied. The presently disclosed embodiments are therefore considered in all respects to be illustrative, and not restrictive. The scope of the invention is indicated by the following claims, rather than the foregoing description, and all changes that come within the meaning and range of equivalence thereof are intended to be embraced therein.

What is claimed is:

1. In a graphical user interface for a computer, which includes a control object having a first element that moves relative to a second element under control of a user-actuated cursor, a method for drawing the first element to track movement of the cursor, comprising the steps of:

defining current display regions for the first and second elements;

detecting movement of the cursor;

calculating a tracking region for the first element in response to the detected movement of the cursor, said tracking region defining a new position for the first element that corresponds to a detected position of the cursor;

calculating a redraw region for the second element which defines an area of the second element's display region that changes as a result of the detected movement of the cursor;

drawing a pattern for the first element in the calculated tracking region; and drawing a pattern for the second element only in the calculated redraw region in response to the detected movement of the cursor.

2. The method of claim 1 wherein said control object comprises a scroll bar in which said first element is a thumb and said second element is a background area over which said thumb moves.

3. The method of claim 1 wherein said step of calculating a tracking region includes the step of constraining said tracking region to remain within the display region for said second element even if the cursor moves beyond said display region for the second element.

4. The method of claim 1 wherein said graphical user interface selectively operates in a first mode in which said first element follows the movement of the cursor, and in a second mode in which one image of the first element remains stationary while the cursor is moving and another image of the first element follows the movement of the cursor.

5. The method of claim 4 wherein, in said second mode, said one image is the original image of the first element and said other image is a modified image of the first element.

6. The method of claim 5 wherein said modified image is a transparent outline of the first element.

7. The method of claim 4 wherein, when said user interface is in said second mode of operation, said method includes the further step of defining a display region for the stationary image of the first element.

8. The method of claim 7 wherein the step of calculating a tracking region includes the steps of calculating a first region which corresponds to a full image of the first element, and subtracting from said first region any overlapping portion of the display region for the stationary image.

9. The method of claim 7 wherein the step of calculating a redraw region includes the steps of:

subtracting from the current display region for the first element any overlapping portion of the tracking region; and when said user interface is in said second mode of operation, subtracting any overlapping portion of the display region for the stationary image from the remaining current display region for the first element.

10. In a graphical user interface for a computer, which includes a control object having a first element that moves relative to a second element under control of a user-actuated cursor, where said control element selectively operates in a first mode in which said first element follows the movement of the cursor, and in a second mode in which one image of the first element remains stationary while the cursor is moving and another image of the first element follows the movement of the cursor, a method for drawing the first element to track movement of the cursor, comprising the steps of:

defining a current display region for the first element;

defining a display region for the stationary image of the first element when said user interface is in said second mode of operation;

detecting movement of the cursor;

calculating a tracking region for the first element in response to the detected movement of the cursor, said tracking region comprising a full image of the first element that corresponds to a detected position of the cursor;

subtracting from said tracking region any overlapping portion of the display region for the stationary image when said user interface is in said second mode of operation; and drawing a pattern for the first element in the calculated tracking region.

11. The method of claim 10 wherein said control object comprises a scroll bar in which said first element is a thumb and said second element is a background area over which said thumb moves.

12. The method of claim 10 wherein said step of calculating a tracking region includes the step of constraining said tracking region to remain within the display region for said second element even if the cursor moves beyond said display region for the second element.

13. The method of claim 10 wherein, in said second mode, said one image is the original full image of the first element and said other image is a modified image of the first element.

14. The method of claim 13 wherein said modified image is a transparent outline of the first element.

15. The method of claim 10 further including the steps of:

subtracting from the current display region for the first element any overlapping portion of the tracking region to define a redraw region for the second element;

subtracting any overlapping portion of the display region for the stationary image from the redraw region when said user interface is in said second mode of operation; and drawing a pattern for the second element in the remaining redraw region.

16. A graphical user interface for a computer, comprising:

a control object having a first element that moves relative to a second element;

a user-actuated cursor for controlling the movement of said first element;

a memory storing current display regions for the first and second elements;

means responsive to movement of said cursor for calculating a tracking region for the first element which defines a new position for the first element;

means for calculating a redraw region for the second element which defines an area of the second element's display region that changes as a result of movement of the cursor; and means for drawing a pattern for the first element in the calculated tracking region and for drawing a pattern for the second element only in the calculated redraw region in response to the detected movement of said cursor.

17. The user interface of claim 16 wherein said control object comprises a scroll bar in which said first element is a thumb and said second element is a background area over which said thumb moves.

18. In a graphical user interface for a computer, which includes a control object having a first element that moves relative to a second element under control of a user-actuated cursor, a method for drawing the first element to track movement of the cursor, comprising the steps of:

defining current display regions for the first and second elements;

detecting movement of the cursor;

calculating a tracking region for the first element in response to the detected movement of the cursor, said tracking region defining a new position for the first element that corresponds to a new position of the cursor resulting from said detected movement;

calculating a redraw region for the second element which defines an area of the second element's display region that is vacated by said first element as a result of the detected movement of the cursor;

drawing a pattern for the first element in the calculated tracking region; and drawing a pattern for the second element only in the calculated redraw region in response to the detected movement of the cursor.

19. In a graphical user interface for a computer, which includes a control object having a first element that moves relative to a second element under control of a user-actuated cursor, a method for drawing the first element to track movement of the cursor, comprising the steps of:

defining current display regions for the first and second elements;

drawing the first and second elements in the respective display regions;

detecting movement of the cursor;

calculating a tracking region for the first element in response to the detected movement of the cursor, said tracking region defining a new position for the first element that corresponds to a detected position of the cursor;

calculating a redraw region for the second element which defines an area of the second element's display region that changes as a result of the detected movement of the cursor;

drawing a pattern for the first element in the calculated tracking region; and drawing a pattern for the second element in the calculated redraw region in response to the detected movement of the cursor, while maintaining the original drawing of the second element in an area of its display region that is outside of the calculated redraw region.

20. A graphical user interface for a computer, comprising:

a control object having a first element that moves relative to a second element;

a user-actuated cursor for controlling the movement of said first element;

a memory storing current display regions for the first and second elements;

means for drawing images of said first and second elements in the respective display regions;

means responsive to movement of said cursor for calculating a tracking region for the first element which defines a new position for the first element;

means for calculating a redraw region for the second element which defines an area of the second element's display region that changes as a result of movement of the cursor; and means for drawing a pattern for the first element in the calculated tracking region and for drawing a pattern for the second element in the calculated redraw region in response to the detected movement of said cursor, while maintaining the original drawing of the second element in an area of its display region that is outside of the calculated redraw region.

* * * * *